(12) United States Patent
Hamashima et al.

(10) Patent No.: US 10,514,208 B2
(45) Date of Patent: Dec. 24, 2019

(54) HEAT STORAGE

(71) Applicant: KYOCERA Corporation, Kyoto-shi, Kyoto (JP)

(72) Inventors: Hiroshi Hamashima, Hikone (JP); Katsumi Nakamura, Koka (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 256 days.

(21) Appl. No.: 15/521,823

(22) PCT Filed: Oct. 28, 2015

(86) PCT No.: PCT/JP2015/080434
§ 371 (c)(1),
(2) Date: Apr. 25, 2017

(87) PCT Pub. No.: WO2016/068205
PCT Pub. Date: May 6, 2016

(65) Prior Publication Data
US 2017/0248376 A1    Aug. 31, 2017

(30) Foreign Application Priority Data

Oct. 29, 2014 (JP) .................. 2014-220260

(51) Int. Cl.
| F28D 20/02 | (2006.01) |
| C09K 5/06 | (2006.01) |
| F24S 60/00 | (2018.01) |

(52) U.S. Cl.
CPC .......... *F28D 20/023* (2013.01); *C09K 5/063* (2013.01); *F28D 20/02* (2013.01); *F28D 20/021* (2013.01);
(Continued)

(58) Field of Classification Search
CPC .......... F28D 17/00; F28D 17/02; F28D 19/00; F28D 19/04; F28D 20/0056; F28D 20/02;
(Continued)

(56) References Cited

U.S. PATENT DOCUMENTS 4,055,451 A * 10/1977 Cockbain .............. C04B 35/593
                                                  156/89.27
4,513,053 A * 4/1985 Chen .................... F28D 20/023
                                                  106/DIG. 3
(Continued)

FOREIGN PATENT DOCUMENTS

| JP | 2011-038751 A | 2/2011 |
| JP | 2013-194927 A | 9/2013 |

(Continued)

OTHER PUBLICATIONS

Machine Translation JP 2013-194927A (Year: 2013).*
(Continued)

*Primary Examiner* — Keith M Raymond
*Assistant Examiner* — Gustavo A Hincapie Serna
(74) *Attorney, Agent, or Firm* — Viering, Jentschura & Partner MBB

(57) ABSTRACT

Provided is a heat storage including a container including a first container made of ceramics and a second container made of ceramics, the first container and the second container being combined, and a heat storage material housed inside the container. The first container and the second container are bonded via a bonding member. A volume occupied by pores in the first container, in a first contact region including a surface section in contact with the bonding member, is greater than a volume occupied by pores in regions other than the first contact region. A volume occupied by pores in the second container, in a second contact region including a surface section in contact with the bonding member, is greater than a volume occupied by pores in regions other than the second contact region.

20 Claims, 7 Drawing Sheets

(52) U.S. Cl.
CPC ............. *F28D 20/025* (2013.01); *F24S 60/00* (2018.05); *F28D 20/028* (2013.01)

(58) Field of Classification Search
CPC .... F28D 20/021; F28D 20/023; F28D 20/025; F28D 20/028; F28D 2020/0004; F28D 2020/0013; F28D 2020/0017; F28D 2020/0021; F28D 2020/0026; F28F 21/00; F28F 21/04; F28F 2275/00; F28F 2275/02; F24S 60/00; F24S 90/00; B32B 18/00; B32B 2315/02; C04B 2237/00; C04B 2237/32; C04B 2237/582; C04B 2237/61; C04B 2237/62; Y10T 428/131; Y10T 428/1317; Y10T 428/1321
USPC .............................. 165/4, 10; 428/35.4–34.7
See application file for complete search history.

(56) References Cited

U.S. PATENT DOCUMENTS

| | | | | |
|---|---|---|---|---|
| 8,394,543 | B2* | 3/2013 | Suyama | C04B 35/573 204/194 |
| 9,011,997 | B2* | 4/2015 | Weber | B32B 37/144 428/336 |
| 9,126,384 | B2* | 9/2015 | Minami | B23K 1/008 |
| 10,101,095 | B2* | 10/2018 | Ide | F28D 20/023 |
| 2008/0230203 | A1* | 9/2008 | Christ | C09K 5/063 165/10 |
| 2009/0011178 | A1* | 1/2009 | Masukawa | C04B 38/08 428/116 |
| 2010/0087115 | A1* | 4/2010 | Davis | B01J 13/22 442/136 |
| 2011/0259544 | A1* | 10/2011 | Neti | F28D 20/023 165/10 |
| 2013/0077731 | A1* | 3/2013 | Sherwood | G21C 3/07 376/417 |
| 2013/0105106 | A1* | 5/2013 | Goswami | F28D 20/026 165/10 |
| 2013/0133853 | A1* | 5/2013 | Stroganov | F15B 1/024 165/4 |
| 2013/0298991 | A1* | 11/2013 | Parker | C09K 5/02 136/259 |
| 2016/0214176 | A1* | 7/2016 | Bruck | C23C 24/103 |
| 2017/0008125 | A1* | 1/2017 | Bruck | G01K 1/08 |

FOREIGN PATENT DOCUMENTS

| | | | |
|---|---|---|---|
| JP | 2013194927 A * | 9/2013 | ......... F28D 20/0056 |
| JP | 2015-215151 A | 12/2015 | |

OTHER PUBLICATIONS

New Energy and Industrial Technology Development Organization, "NEDO White Paper on Renewable Energy Technologies—For Realization of New Energy Society: 5. Solar Thermal Energy Technologies: Present Situations and Roadmap", Jul. 27, 2010 (Searched on Apr. 22, 2014), URL: http://www.nedo.go.jp/content/100107273.pdf.
International Search Report (Form PCT/ISA/210) dated Jan. 19, 2016, issued for PCT/JP2015/080434.
Written Opinion (Form PCT/ISA/237) dated Jan. 19, 2016, issued for PCT/JP2015/080434.

* cited by examiner

HEAT STORAGE

TECHNICAL FIELD

The present invention relates to a heat storage.

BACKGROUND ART

Solar power generation systems that concentrate sunlight using a lens, a reflective plate, or the like, and generate power using heat collected in the area of the concentrated sunlight are beginning to play a more significant role. FIG. 6 illustrates an example of a solar power generation system introduced in Non-Patent Document 1 described below. The solar power generation system illustrated in FIG. 6 is an example of a so-called tower-type based system and, within the tower-type subgroup, a so-called direct steam generation (DSG) based system. A system 100 illustrated in FIG. 6 includes a reflector group 102 configured by a collection of a plurality of reflectors called heliostats that reflect sunlight toward an upper portion of a tower 104, a collector 106 that is provided to the upper portion of the tower 104, is heated by the sunlight reflected by the reflector group 102, and produces steam from fed water, a water feeder 108 that feeds water to the collector 106, a power generating portion 110 that generates power by the steam produced by the collector 106 and fed thereto, and a condenser 112 that condenses the steam used for power generation in the power generating portion 110, and feeds the water produced by condensation once again to the water feeder 108.

The collector 106 is a container-like member, and includes a plurality of heat storage bodies described later having a relatively large heat capacity. The thermal energy of the sunlight collected in the collector 106 by the reflector group 102 is stored in these heat storage bodies. The water fed from the water feeder 108 to the collector 106 is heated by the thermal energy of these heat storage bodies and turned into steam. This steam is fed to the power generating portion 110, and rotates, for example, a power generation turbine (not illustrated) provided in the power generating portion 110 to generate power.

Such a solar power generation system converts thermal energy stored in the heat storage bodies into electrical energy, and therefore offers advantages such as the ability to continually generate power even at nighttime when sunlight is not directly irradiated, using the stored thermal energy. To store a large amount of thermal energy, heat storage bodies, each having a relatively large heat capacity, need to be disposed in the collector 106 as many as possible (that is, at high density).

The heat storage bodies each include a heat storage material having a relatively large heat capacity, and a container that houses this heat storage material. As the heat storage material, salt (NaCl) which is inexpensive and has a large heat capacity is often used. While the melting point of salt is a high 800° C., the heat storage in a solar power generation system is heated to a temperature that significantly exceeds this 800° C.

FIG. 7 is a cross-sectional view for explaining an embodiment of a conventional heat storage described in Patent Document 1 described below. A heat storage 200 includes a cylindrical member 202 having a bottomed cylindrical shape, a lid 204, and a heat storage material 210 disposed in the interior of the cylindrical member 202. An opening end 202a of the cylindrical member 202 is blocked by the welding of the tubular 202 and the lid 204.

CITATION LIST

Non-Patent Literature

Non-Patent Literature 1: New Energy and Industrial Technology Development Organization, "NEDO saiseikanou enerugi-gijutsu hakusho-Aratana Enerugi—shakai no jitsugen ni mukete—5 taiyounetsuhatsuden no gijutsu no genjo to ro-domappu" ("NEDO Renewable Energy Technology White Paper: Realizing a New Energy Society, 5 Current State of Solar Power Generation Technology and Roadmap"), [online], Jul. 22, 2010, [Searched: Apr. 22, 2014], Internet (URL: http://www.nedo.go.jp/content/100107273.pdf)

Patent Literature

Patent Document 1: US Patent Application No. 2011/0259544

SUMMARY OF INVENTION

Technical Problem

In such a conventional heat storage 200 as set forth in Patent Document 1, when the heat storage material 210 such as salt is heated, the pressure in the interior of the heat storage 200 increases as the volume of the heat storage material 210 expands, sometimes causing a welded section of the opening end 202a of the cylindrical member 202 and the lid 204 to break and the heat storage material 210 to overflow. An objective of the present invention is to solve such problems.

Solution to Problem

The present invention for solving the above-described problems is a heat storage including a container including a first container made of a ceramics and a second container made of a ceramics, the first container and the second container being combined, and a heat storage material housed inside the container. The first container and the second container are bonded via a bonding material. A volume occupied by pores in the first container, in a first contact region including a surface section in contact with the bonding material, is greater than a volume occupied by pores in regions other than the first contact region. Further, a volume occupied by pores in the second container, in a second contact region including a surface section in contact with the bonding material, is greater than a volume occupied by pores in regions other than the second contact region.

Advantageous Effects of Invention

The heat storage according to the present invention can suppress breakage associated with a rise in internal pressure of the heat storage, or the like.

BRIEF DESCRIPTION OF DRAWINGS

FIG. 3B is an image of chlorine (Cl) in the region illustrated in FIG. 3A, analyzed using an energy dispersive X-ray spectroscope (EDS). FIG. 3C is an enlarged photographic image of a portion of FIG. 3A.

FIG. 5B is a cross-sectional view of a collector in the solar power generation system illustrated in FIG. 5A.

DESCRIPTION OF EMBODIMENTS

Hereinafter, a detailed description of examples of an embodiment according to the invention is given while referencing the drawings.

Figure 1A:
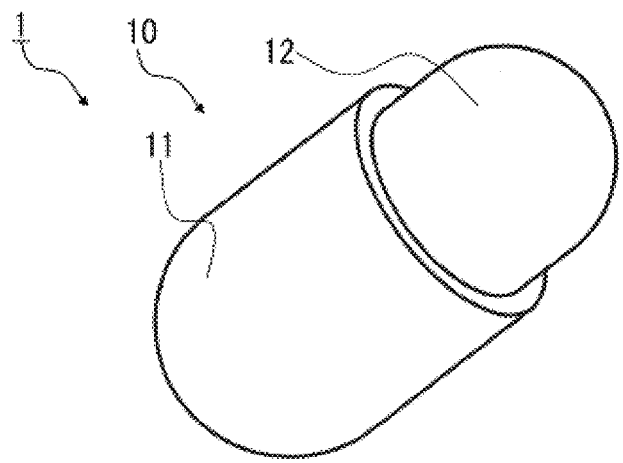
FIG. 1A is a schematic perspective view and FIG. 1B is a schematic cross-sectional view for explaining an embodiment of a heat storage according to the present invention.
Figure 1B:
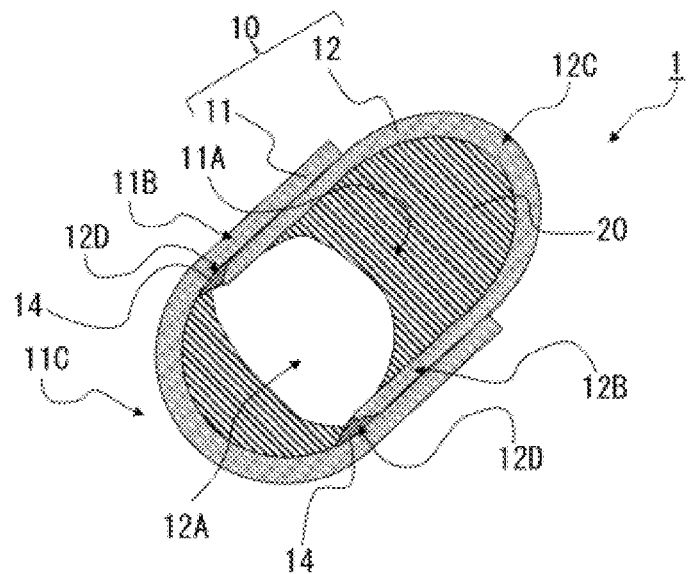
Figure 2:
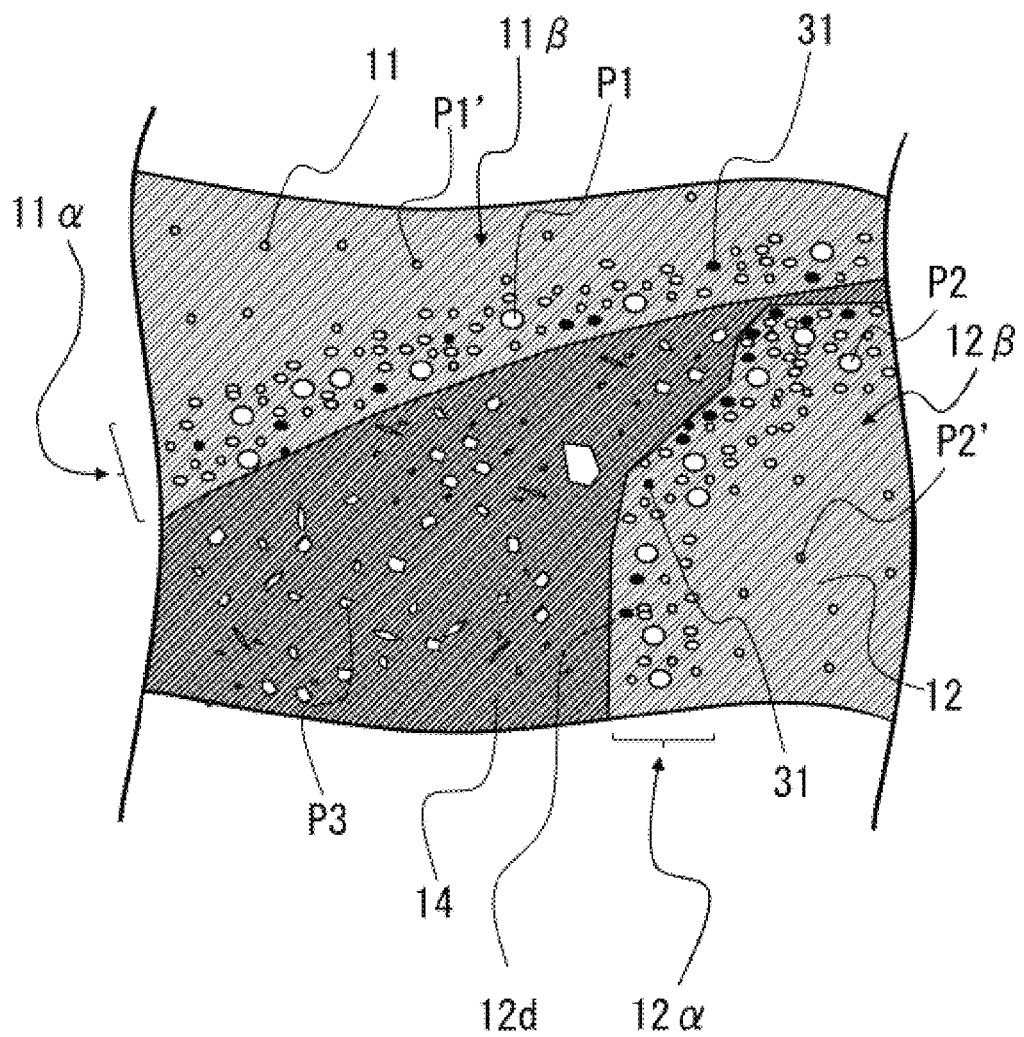
FIG. 2 is an enlarged cross-sectional view of a region of FIG. 1B that includes a bonding portion of a first container and a second container.
Figure 3A:
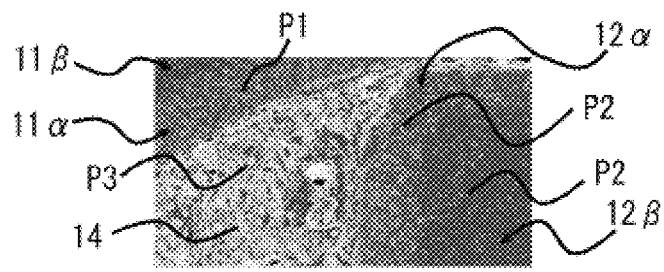
FIGS. 3A to 3C are electron microscope (SEM) photographs of a region corresponding to FIG. 2.
Figure 3B:
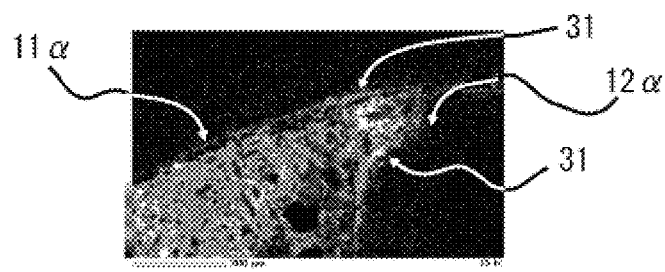
Figure 3C:
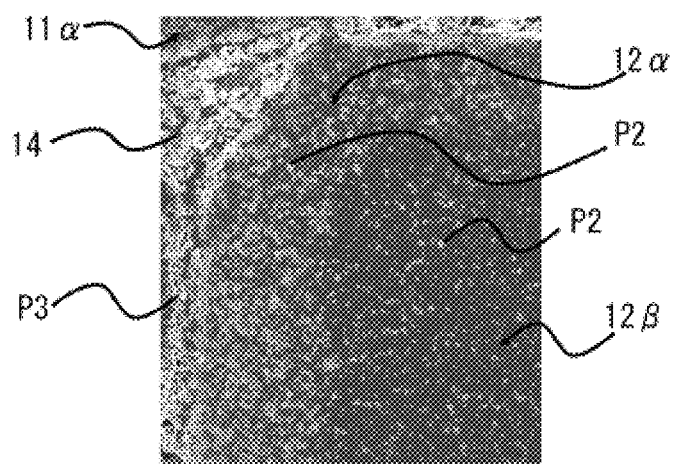

FIG. 1A is a schematic perspective view and FIG. 1B is a schematic cross-sectional view for explaining a heat storage 1 of an embodiment of a heat storage according to the present invention. FIG. 2 is an enlarged cross-sectional view of a region that includes a bonding material that bonds a first container and a second container. FIGS. 3A to 3C are electron microscope (SEM) photographs of a region corresponding to FIG. 2. FIG. 3B is an image of chlorine (Cl) in the region illustrated in FIG. 3A, analyzed using an energy dispersive X-ray spectroscope (EDS). FIG. 3C is an enlarged photographic image of a portion of FIG. 3A. In FIG. 3B, regions having a greater CL content ratio appear whiter.

The heat storage 1 according to the present embodiment includes a container 10 including a first container 11 and a second container 12, and a heat storage material 20 housed inside the container 10. The first container 11 includes a first opening 11A and a first side wall portion 11B surrounding the first opening 11A. The second container 12 includes a second opening 12A and a second side wall portion 12B surrounding the second opening 12A. The second opening 12A has a small opening diameter compared to that of the first opening 11A, an outer peripheral surface of the second side wall portion 12B is located close to an inner peripheral surface of the first side wall portion 11B, and the inner peripheral surface of the first container 11 and an end portion 12D of the second side wall portion 12B are bonded via a bonding material 14. Note that the term "close to" above includes contact as well.

Thus, in the heat storage 1, the second opening 12A has a small opening diameter compared to that of the first opening 11A, allowing the second container 12 to be inserted through the first opening 11A so that the outer peripheral surface of the second side wall portion 12B and the inner peripheral surface of the first side wall portion 11B are close to each other. The adjustment of insertion amount, that is, the degree of overlap of the second side wall portion 12B and the first side wall portion 11B makes it possible to adjust the size of an internal space of the heat storage 1. Note that the way of combining the first container 11 and the second container 12 and the like are not limited to the present embodiment. For example, an end portion of the first side wall portion 11B and an end portion 12D of the second side wall portion 12B may be bonded via the bonding material 14 while the opening diameters of the second opening 12A and the first opening 11A are made substantially the same. A design in which the first container 11 and the second container 12 are combined with a step provided to each end portion is also acceptable.

In the example illustrated in FIGS. 1A and 1B, the first opening 11A and the second opening 12A have circular shapes. Even when an internal pressure of the heat storage body 1 increases, for example, the first opening 11A and the second opening 12A with a circular shape can prevent this pressure from locally concentrating on a corner or the like of the inner wall surface as in a case where the opening has a polygonal shape, for example.

Further, in the example illustrated in FIGS. 1A and 1B, the first side wall portion 11B and the second side wall 12B have cylindrical shapes. Further, the first container 11 includes a bottom 11C having a substantially hemispherical shape, and the second container 12 includes a bottom 12C having a substantially hemispherical shape. Such a configuration makes it possible to prevent the concentration of pressure applied to the bottom as well. As illustrated in FIGS. 1A and 1B, when a corner does not exist in the outer periphery of the container 10, damage due to the collision between outer surfaces of the heat storage bodies 1 can be prevented, even when a plurality of heat storage bodies 1 are accumulated and disposed inside the same container in a plurality of random positions. Further, FIGS. 1A to 2 illustrate an example in which the end portion 12D of the second side wall portion 12B includes a step where the outer peripheral surface side of the second side wall portion 12 is recessed.

The first container 11 and the second container 12 are made of a ceramics. While the type of ceramics is not particularly limited, a material having relatively high thermal resistance and mechanical strength is preferably contained as a main component. Examples of the type of ceramics include alumina, steatite, mullite, forsterite, spinel, and cordierite.

The heat storage 1 of the present embodiment includes the container 10 including the first container 11 and the second container 12, and the heat storage material 20 housed inside the container 10. The first container 11 and the second container 12 are bonded via the bonding material 14. Then, a volume occupied by pores P1 in the first container 11, in a first contact region 11a including a surface section that comes into contact with the bonding material 14, is greater than a volume occupied by pores P1' in a region 11β other than the first contact region 11α. Further, a volume occupied by pores P2 in the second container 12, in a second contact region 12a including a surface section that comes into contact with the bonding material 14, is greater than a volume occupied by pores P2' in a region 12β other than the second contact region 12α.

Note that the first contact region 11a is a portion of the region of the first container 11 that includes a surface that comes into contact with the bonding material 14, and is the region from the surface that comes into contact with the bonding material 14 to a position 300 µm toward the interior of the first container 11. Similarly, the second contact region 12a is a portion of the region of the second container 12 that includes a surface that comes into contact with the bonding material 14, and is the region from the surface that comes into contact with the bonding material 14 to a position 300 µm toward the interior of the second container 12. For example, the volume occupied by the pores P1 of the first contact region 11a and the pores P2 of the second contact region 12a is from 10% to 50%, and the volume occupied by the pores P1' of the other region 11β and the pores P2' of the other region 12β is from about 0.5% to 5%.

The volume occupied by each of the pores P1, P1', P2, and P2', as described below, may be a value measured on the basis of the surface area of each pore verified by the cross sections of the first container 11 and the second container 12. For example, using an optical microscope, an observation range is set so that each visual field (the first contact region 11α, the region 11β that differs from the first contact region 11α, the second contact region 12α, and the region 12β that differs from the second contact region 12α) has a surface area of 112.5 mm² (for example, a horizontal length of 12.38 mm, and a vertical length of 9.09 mm) at a multiplication factor of 100×. Then, an image of each visual field is incorporated by a CCD camera and analyzed by a technique called particle analysis using the image analysis software "Azo-kun" (trade name, Asahi Kasei Engineering Cooperation). A lightness of particle, a binarization method, and a small figure removal area serving as the setup conditions of this technique are set to dark, manual, and 5 μm, respectively, and a threshold serving as an index indicating the lightness and darkness of the image is set to 0.88 times a peak value of a histogram indicating the brightness of each point (pixel) inside the image. The surface area of the pores of each visual field can be found by analyzing each of the visual fields using these settings. The volume occupied by the pores of each field can then be found by dividing the found surface area of the pores of each visual field by the surface area of the field (observation range). This occupying ratio of the surface area is expressed as a volume occupied by the pores in the present embodiment.

The volume occupied by the pores P1 of the first contact region 11α in the first container 11 is relatively large, and the volume occupied by the pores P2 of the second contact region 12α in the second container 12 is relatively large, making the first contact region 11α and the second contact region 12α relatively easy to deform. As a result, even when a heat cycle having high and low temperatures that alternately repeat is applied to the container 10, the stress associated with an increase in internal pressure of the container 10 caused by the softening and expansion of the heat storage material 20 can be alleviated by deformation of the first contact region 11α and the second contact region 12α.

The bonding material 14 contains SiO₂ as a main component. The SiO₂ included as the main component in the bonding material 14 readily bonds to the SiO₂ included in a ceramics such as alumina, and thus the bonding strength of the first container 11 with the bonding material 14 and the bonding strength of the second container 12 with the bonding material 14 are relatively great. Further, the bonding material 14 contains SiO₂ as a main component, and the bonding material 14 further contains CaO. A particle-like compound has been produced from the CaO included in the bonding material 14 with an oxide constituent such as MgO included in the first container 11 and the second container 12 made of a ceramics such as alumina, for example. Thus, the bonding strength of the first container 11 with the bonding material 14 and the bonding strength of the second container 12 with the bonding material 14 are relatively great.

The bonding material 14 includes a plurality of pores P3, and at least a portion of these pores P3 is exposed to the interior (interior of the container 10). Even when the heat storage 1 is heated to high temperatures exceeding 800° C., for example, a portion of expanded air enters the pores P3 exposed to the interior, suppressing a rise in the internal pressure of the container 10. Additionally, a portion of air passes through the pores P3 that communicate and escapes outside the heat storage 1, preventing the internal pressure of the heat storage 1 from increasing more than necessary.

The heat storage material 20 contains sodium chloride as a main component. Salt containing sodium chloride (NaCl) as the main component can be purchased in large quantities relatively inexpensively and has a large heat capacity, and is thus preferably used as the heat storage material 20.

The bonding material 14 includes the pores P3, the pores P1 of the first contact region 11a and the pores P2 of the second contact region 12a communicate with the interior of the container 10 via the pores P3 of the bonding material 14.

In the container 10, the volume occupied by the pores P1 of the first contact region 11α in the first container 11 is relatively large, and the volume occupied by the pores P2 of the second contact region 12α in the second container 12 is relatively large, allowing the constituent elements (constituent elements of NaCl) of the heat storage material 20 to readily enter the pores P1 and P2 via the pores P3 of the bonding material 14. For example, in the process of heating and increasing the temperature of the heat storage 1, the heat storage material 20 inside the container 10 enters the first contact region 11α and the second contact region 12α via the pores P3 of the bonding material 14, thereby suppressing an excessive rise in pressure inside the container 10 associated with the temperature rise. As a result, a granular portion 31 that contains a constituent (Cl in the present embodiment) of the heat storage material 20 is formed in the first contact region 11α and the second contact region 12α. When the granular portion 31 containing Cl exists in the first contact region 11α and the second contact region 12α, the Cl of the granular portion 31, in the process of cooling the heat storage 1, enters the container 10, thereby preventing the pressure inside the container 10 from excessively decreasing. The pores P1 of the first contact region 11α and the pores P2 of the second contact region 12α communicate with the interior of the container 10 via the pores P3 of the bonding material 14. This communication can be observed by the granular portion 31 containing a constituent of the heat storage material 20 existing in the first contact region 11α and the second contact region 12α. For example, the granular portion 31 of the present embodiment is formed by chlorine (Cl), which is a constituent element of NaCl, entering the pores P1 and P2 via the pores P3 of the bonding material 14. The constituent elements of the heat storage material 20 that exist in the first contact region 11α and the second contact region 12α may be observed by element distribution measurement or the like using an energy dispersive X-ray spectroscope (EDS).

Figure 4A:
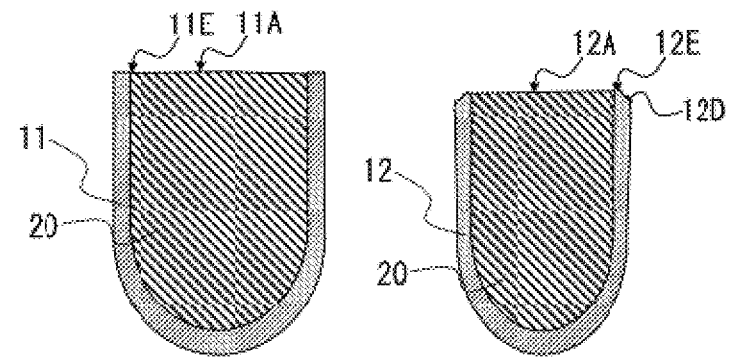
FIGS. 4A to 4C are schematic cross-sectional views illustrating an example of a method for manufacturing the heat storage illustrated in FIGS. 1A and 1B.
Figure 4B:
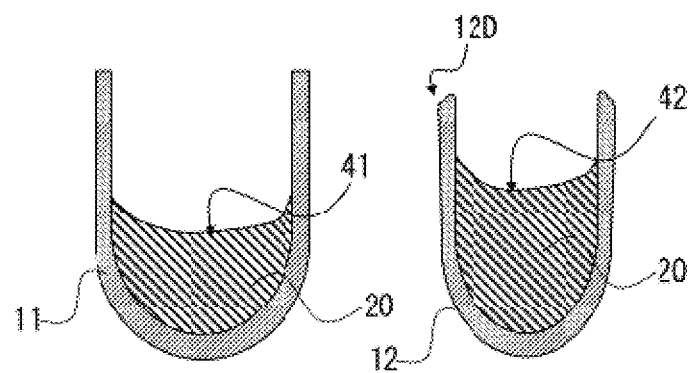
Figure 4C:
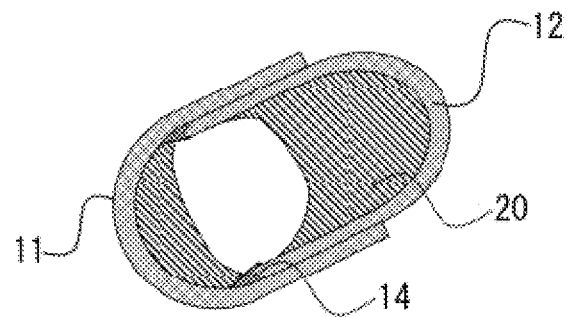

FIGS. 4A to 4C are schematic cross-sectional views illustrating an example of a method for manufacturing the heat storage illustrated in FIGS. 1A and 1B. First, the first container 11 and the second container 12 made of ceramic sintered body are prepared. The first container 11 has an outer diameter of about 10 to 50 mm, an inner diameter of about 8 to 48 mm, and a length of about 0 to 50 mm. The outer diameter of the second container 12 is smaller than the inner diameter of the first container by about 0.3 to 2 mm. The first container 11 and the second container 12 can be obtained by firing a molded ceramic form formed by pressure molding, for example. Next, as illustrated in FIG. 4A, the granular heat storage material 20 (NaCl) is introduced from the first opening 11A of the first container 11, and the granular heat storage material 20 (NaCl) is introduced from the second opening 12A of the second container 12. At this stage, the first container 11 is filled with the heat storage material 20 up to an edge portion 11E of the first opening 11A of the first container 11, and the second container 12 is similarly filled with the heat storage material 20 up to an edge portion 12E of the second opening 12A of the second container 12.

Next, the first container 11 and the second container 12 filled with the heat storage material 20 are heated to 800° C. or higher, for example, to melt the heat storage material 20 made of salt, and subsequently cooled. There is a relatively large space between granules of the heat storage material 20 prior to heating. Thus, even when each container is filled with the heat storage material 20 up to the edge portion of the opening, about half of the space of each container is filled with air and the actual volume of the heat storage material 20 is half or less. Granules of the heat storage material 20 becomes a liquid by heating, causing the space between the granules to be eliminated and the heat storage material 20 after cooling to be in a bulk state rather than a collection of granules. In the first container 11, as illustrated in FIG. 4B, the position of an upper surface (first upper surface 41) of the heat storage material 20 in this bulk state is away from the edge portion 11E of the first container 11. Similarly, in the second container 12, the position of an upper surface (second upper surface 42) of the heat storage material 20 is away from the edge portion 12E of the second container 12.

Next, the second side wall portion 12B of the second container 12 is inserted through the first opening 11A so that the outer peripheral surface of the second side wall portion 12B is located close to the inner peripheral surface of the first side wall portion 11B, and the inner peripheral surface of the first container 11 and the end portion 12D of the second side wall portion 12B are bonded via the bonding material 14 (FIG. 4C).

As illustrated in FIG. 4C, the combination of the first container 11 and the second container 12 makes it possible to configure the heat storage 1 using a single container while keeping the content volume of the heat storage material 20 the same, compared to the case where the heat storage is configured by simply covering the first container 11 in the state illustrated in FIG. 4B with a lid. Such a configuration increases a housing efficiency of the collector.

Further, the end portion 12D of the second container 12 includes a step as described above. Such a step allows the second side wall portion 12B of the second container 12 to be inserted into the first container 11 relatively deeply, even when the heat storage material 12 inside the first container 11 solidifies in a liquid surface shape so that the first container 11 is wetted along the inner wall, thereby making it possible to increase a filling rate of the heat storage material 20.

Next, the bonding of the first container 11 and the second container 12 via the bonding material 14 will be described in detail. In the bonding of the first container 11 and the second container 12, a bonding paste that serves as a precursor of the bonding material 14 is applied to the second side wall portion 12B of the second container 12. The bonding paste is made from glass particles, an organic compound, and a solvent that dissolves this organic compound. Examples of the composition of the bonding paste, excluding the organic compound and the solvent, include from 85 to 95 mass % of Si in terms of $SiO_2$, from 3 to 7 mass % of Ca in terms of CaO, from 0.2 to 1.0 mass % of Al in terms of $Al_2O_3$, and from 0.2 to 1.0 mass % of Na in terms of $Na_2O$. With such a bonding paste applied to the second side wall portion 12B, the first container 11 and the second container 12 are fitted together, and thermal treatment is performed for about 3 hours at 500° C. At the time of this thermal treatment, the CaO included in the bonding paste reacts with the MgO constituent, the $SiO_2$ constituent, and the like included in the first container 11 and the second container 12 to form a compound. In this compound formation process, the $SiO_2$ constituent contained in the first container 11 and the second container 12 moves toward the bonding material 14 so as to be incorporated by the bonding material 14, thereby forming a relatively large number of pores (pores P1 and pores P2) in the first contact region 11α of the first container 11 and the second contact region 12α of the second container 12.

Subsequently, the container 10 with the heat storage material 20 therein is heated to 900 to 1000° C. in air and then cooled. During this heating as well, the $SiO_2$ constituent included in the first container 11 and the second container 12 moves further toward the bonding material 14, and a greater number of pores are formed in the first contact region 11α of the first container 11 and the second contact region 12α of the second container 12. Through such processes, the volume occupied by the pores P1 in the first contact region 11α including a surface section that comes into contact with the bonding material 14 is greater than the volume occupied by the pores P1' in the region 11β other than the first contact region 11α. Further, the volume occupied by the pores P2 in the second contact region 12α including a surface section that comes into contact with the bonding material 14 is greater than the volume occupied by the pores P2' in the region 12β other than the second contact region 12α.

At this time, a large number of the pores P3 are formed in the bonding material 14. This is because volume contraction occurs when the $SiO_2$ constituent melts, forming gaps, and these gaps become the pores P3. Further, the heat storage material 20 melts by the 900 to 1000° C. heat, increasing the pressure in the interior of the container 10. The melted heat storage material 20 passes through the pores P3 of the bonding material 14 and enters the pores P1 of the first container 11 and the pores P2 of the second container 12, thereby decreasing the pressure inside the container 10. As a result, the granular portions 31 containing Cl are disposed in the first contact region 11α and the second contact region 12α.

Figure 5A:
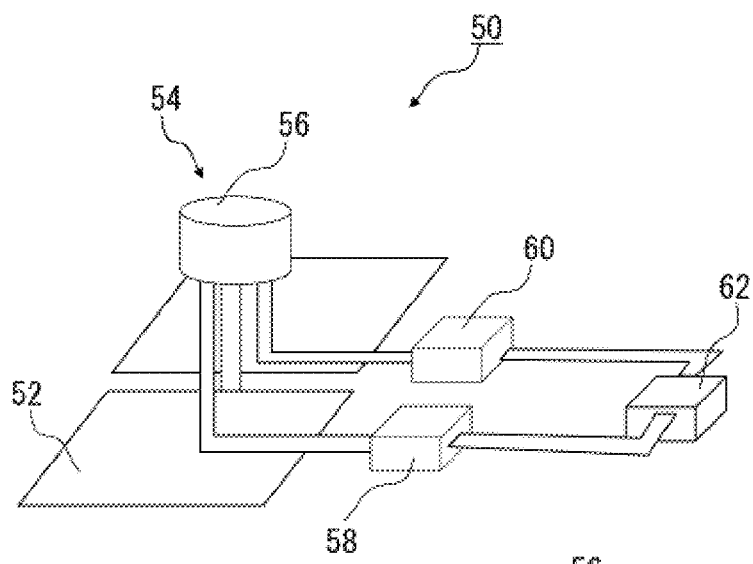
FIGS. 5A and 5B are schematic configuration views illustrating an example of a solar power generation system configured using the heat storage illustrated in FIGS. 1A and 1B.
Figure 5B:
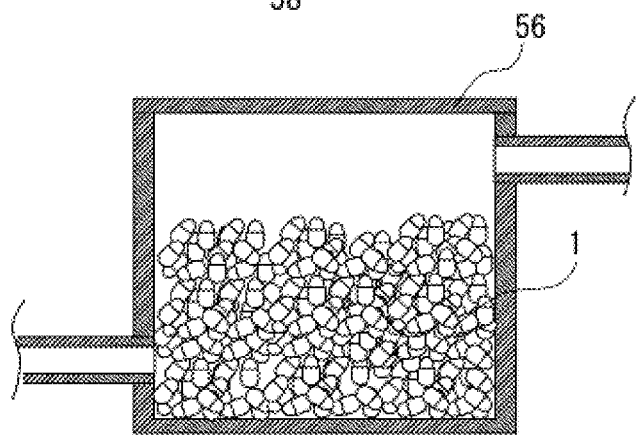
Figure 6:
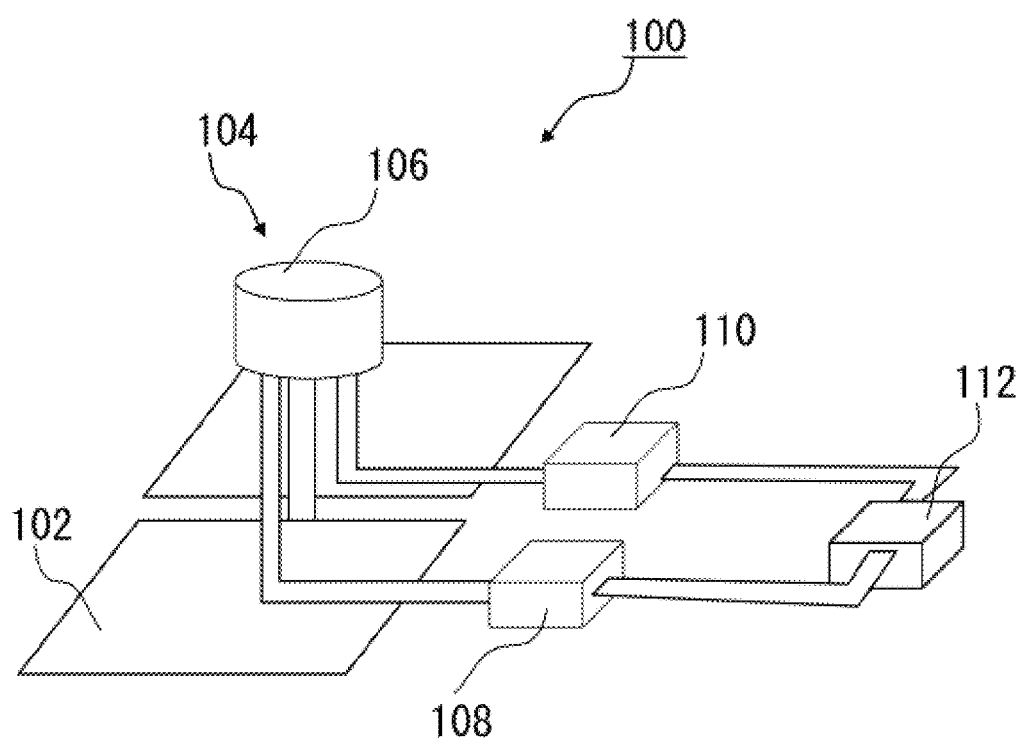
FIG. 6 is a schematic configuration view of an example of the solar power generation system.
Figure 7:
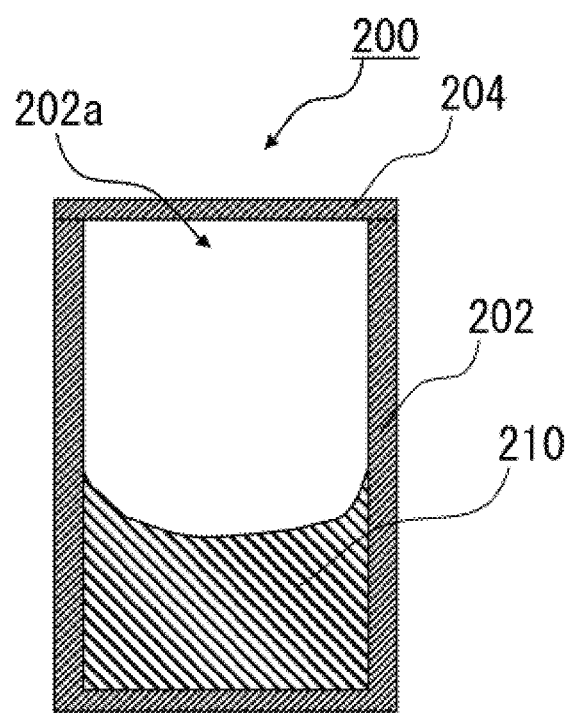
FIG. 7 is a schematic cross-sectional view illustrating an example of a conventional heat storage.

FIG. 5A is a schematic configuration view illustrating a system 50 serving as an example of a solar power generation system configured using the heat storage 1 according to the present embodiment. FIG. 5B is a cross-sectional view of a collector 56 in the system 50 illustrated in FIG. 5A. The system 50 is an example of solar power generation system of a so-called direct steam generation (DSG) system type. The system 50 illustrated in FIG. 5A includes a plurality of reflector groups 52 called heliostats that reflect sunlight toward an upper portion of a tower 54, the collector 56 that is provided near an upper end portion of the tower 54, is heated by the sunlight reflected by the reflector groups 52, and produces steam from fed water by the heat, a water feeder 58 that feeds water to the collector 56, a power generating portion 60 that generates power by the steam produced by the heating by the collector 56 and fed thereto, and a condenser 62 that condenses the steam used for power generation in the power generating portion 60, and feeds the water produced by condensation once again to the water feeder 58. As illustrated in FIG. 5B, the collector 56 is a container-like member, and a plurality of heat storage bodies 1 are disposed therein. The thermal energy of the sunlight collected in the collector 56 by the reflector groups 52 is stored in these heat storage bodies 1. The water fed from the water feeder 58 to the collector 56 is heated by the thermal energy of these heat storage bodies 1 to produce steam. This steam is fed to the power generating portion 60, and rotates a power generation turbine (not illustrated), for example, provided in the power generating portion 60 to generate power.

In the system 50, the heat storage material 20 containing salt as the main component is encapsulated at ample high density in the heat storage 1, and the heat capacity is relatively large. As a result, the system 50 that uses the heat storage 1 allows the collector 50 to store a relatively high amount of energy. Thus, the system 50 can produce a relatively large amount of electrical energy (generate power) even at nighttime when sunlight is substantially no longer irradiated by using the stored thermal energy.

Thus, with the heat storage 1 according to the present embodiment, a rise in the internal pressure of the heat storage 1 and damage to the bonding material 14 associated with the softening and expansion of the heat storage material 20 are suppressed, making it possible to repeatedly generate power across a relatively long period of time using the system 50 and the like. Further, the first container 11 and the second container 12 have profile shapes that do not have a corner and thus damage that occurs when the outer surfaces of the heat storage bodies 1 collide is suppressed, even when a plurality of heat storage bodies 1 are accumulated and disposed inside the collector 56 in a plurality of random positions.

Although the above has described embodiments and examples according to the present invention, the present invention is not limited thereto. Various modifications and variations can be made to the present invention without departing from the spirit and scope thereof.

EXAMPLES

The heat storage 1 having a shape such as illustrated in FIGS. 1A and 1B was manufactured. Specifically, manufacturing was performed as follows.

A dense alumina ceramics was prepared as the first container 11. The first container 11 had an outer diameter of 30 mm, an inner diameter of 28 mm, and a length of 20 mm. A dense alumina ceramics was prepared as the second container 12. The second container 12 had an outer diameter of 27 mm, an inner diameter of 25 mm, and a length of 25 mm. The first container 11 and the second container 12 were filled with an NaCl powder serving as the heat storage material 20. The first container 11 and the second container 12 were heated to 950° C. and subsequently cooled, thereby melting and solidifying the NaCl serving as the heat storage material 20 inside the first container 11 and the second container 12.

With a paste used for a bonding layer applied to the second side wall portion 12B, the first container 11 and the second container 12 were fitted together and dried. The composition of the bonding paste, excluding the organic compound and the solvent, used for the bonding layer included from 85 to 95 mass % of Si in terms of $SiO_2$, from 3 to 7 mass % of Ca in terms of CaO, from 0.2 to 1.0 mass % of Al in terms of $Al_2O_3$, and from 0.2 to 1.0 mass % of Na in terms of $Na_2O$. With such a paste used for a bonding portion applied to the second side wall portion 12B, the first container 11 and the second container 12 were fitted together, and thermal treatment was performed for about 3 hours at 500° C. Subsequently, the container 10 was heated to 900° C. in air and then cooled to obtain the heat storage 1.

Observations of the heat storage 1 revealed that there was no visual evidence of leakage of the heat storage material 20. The weight of the heat storage 1 was measured, and this weight was defined as an initial stage weight.

Next, a temperature cycle test was conducted. The obtained heat storage 1 was heated to 800° C. and then cooled to room temperature. This heating and cooling was repeated twice. Subsequent observations of the heat storage material 20 revealed that there was no visual evidence of leakage of the NaCl serving as the heat storage material 20. The weight of the heat storage 1 after the temperature cycle test did not change within a range of measurement error compared to the initial stage weight, and thus there was no evidence of leakage of the heat storage material 20 in this temperature cycle test.

REFERENCE SIGNS LIST

1 Heat storage
10 Container
11 First container
11α First contact region
12 Second container
12α Second contact region
14 Bonding material
P1, P1', P2, P2', P3 Pore
20 Heat storage material
50 System
52 Reflector group
54 Tower
56 Collector
58 Water feeder
60 Power generating portion
62 Condenser

What is claimed is:

1. A heat storage comprising:
   a container comprising a first container made of a ceramics and a second container made of a ceramics, the first container and the second container being combined; and
   a heat storage material housed inside the container;
   the first container and the second container being bonded via a bonding material;
   wherein
     a volume occupied by pores in the first container, in a first contact region comprising a surface section in contact with the bonding material, is greater than a volume occupied by pores in regions other than the first contact region, and
     a volume occupied by pores in the second container, in a second contact region comprising a surface section in contact with the bonding material, is greater than a volume occupied by pores in regions other than the second contact region.

2. The heat storage according to claim 1, wherein
the heat storage material contains NaCl as a main component.

3. The heat storage according to claim 1, wherein
the bonding material comprises a plurality of pores, and at least a portion of the pores is exposed to the interior of the container.

4. The heat storage according to claim 3, wherein
the bonding material contains pores, and the pores in the first contact region and the pores in the second contact region communicate with the interior of the container via the pores in the bonding material.

5. The heat storage according to claim 1, wherein the bonding material contains $SiO_2$ as a main component.

6. The heat storage according to claim 5, wherein the bonding material contains $SiO_2$ as a main component, and wherein the bonding material further contains CaO.

7. The heat storage according to claim 1, wherein:
the first container comprises a first opening and a first side wall portion surrounding the first opening;
the second container comprises a second opening and a second side wall portion surrounding the second opening; and
the second opening has a smaller opening diameter compared to that of the first opening, an outer peripheral surface of the second side wall portion is located close to an inner peripheral surface of the first side wall portion, and the inner peripheral surface of the first container and an end portion of the second side wall portion are bonded via the bonding material.

8. The heat storage according to claim 7, wherein the first opening and the second opening have circular shapes.

9. The heat storage according to claim 7, wherein the second side wall portion comprises a region where the outer peripheral surface of the second side wall portion comes closer to an inner peripheral surface of the second side wall portion as a distance to an end portion on the second opening side decreases.

10. The heat storage according to claim 2, wherein the bonding material comprises a plurality of pores, and at least a portion of the pores is exposed to the interior of the container.

11. The heat storage according to claim 2, wherein the bonding material contains $SiO_2$ as a main component.

12. The heat storage according to claim 3, wherein the bonding material contains $SiO_2$ as a main component.

13. The heat storage according to claim 4, wherein the bonding material contains $SiO_2$ as a main component.

14. The heat storage according to claim 2, wherein:
the first container comprises a first opening and a first side wall portion surrounding the first opening;
the second container comprises a second opening and a second side wall portion surrounding the second opening; and
the second opening has a small opening diameter compared to that of the first opening, an outer peripheral surface of the second side wall portion is located close to an inner peripheral surface of the first side wall portion, and the inner peripheral surface of the first container and an end portion of the second side wall portion are bonded via the bonding material.

15. The heat storage according to claim 3, wherein:
the first container comprises a first opening and a first side wall portion surrounding the first opening;
the second container comprises a second opening and a second side wall portion surrounding the second opening; and
the second opening has a small opening diameter compared to that of the first opening, an outer peripheral surface of the second side wall portion is located close to an inner peripheral surface of the first side wall portion, and the inner peripheral surface of the first container and an end portion of the second side wall portion are bonded via the bonding material.

16. The heat storage according to claim 4, wherein:
the first container comprises a first opening and a first side wall portion surrounding the first opening;
the second container comprises a second opening and a second side wall portion surrounding the second opening; and
the second opening has a small opening diameter compared to that of the first opening, an outer peripheral surface of the second side wall portion is located close to an inner peripheral surface of the first side wall portion, and the inner peripheral surface of the first container and an end portion of the second side wall portion are bonded via the bonding material.

17. The heat storage according to claim 5, wherein:
the first container comprises a first opening and a first side wall portion surrounding the first opening;
the second container comprises a second opening and a second side wall portion surrounding the second opening; and
the second opening has a small opening diameter compared to that of the first opening, an outer peripheral surface of the second side wall portion is located close to an inner peripheral surface of the first side wall portion, and the inner peripheral surface of the first container and an end portion of the second side wall portion are bonded via the bonding material.

18. The heat storage according to claim 6, wherein:
the first container comprises a first opening and a first side wall portion surrounding the first opening;
the second container comprises a second opening and a second side wall portion surrounding the second opening; and
the second opening has a small opening diameter compared to that of the first opening, an outer peripheral surface of the second side wall portion is located close to an inner peripheral surface of the first side wall portion, and the inner peripheral surface of the first container and an end portion of the second side wall portion are bonded via the bonding material.

19. The heat storage according to claim 8, wherein the second side wall portion comprises a region where the outer peripheral surface of the second side wall portion comes closer to an inner peripheral surface of the second side wall portion as a distance to an end portion on the second opening side decreases.

20. A heat storage comprising:
a container comprising a first container made of ceramics and a second container made of ceramics, the first container and the second container connected to form the container; and
a heat storage material inside the container;
the first container and the second container being bonded together via a bonding material;
wherein
the first container comprises a plurality of pores,
the first container has a first contact region in contact with the bonding material,
a volume of the plurality of pores in the first contact region is greater than a volume of the plurality of pores elsewhere in the first container;
the second container comprises a plurality of pores,
the second container has a second contact region in contact with the bonding material, and
a volume of the plurality of pores in the second contact region is greater than a volume of the plurality of pores elsewhere in the second container.

* * * * *